Figure 1:
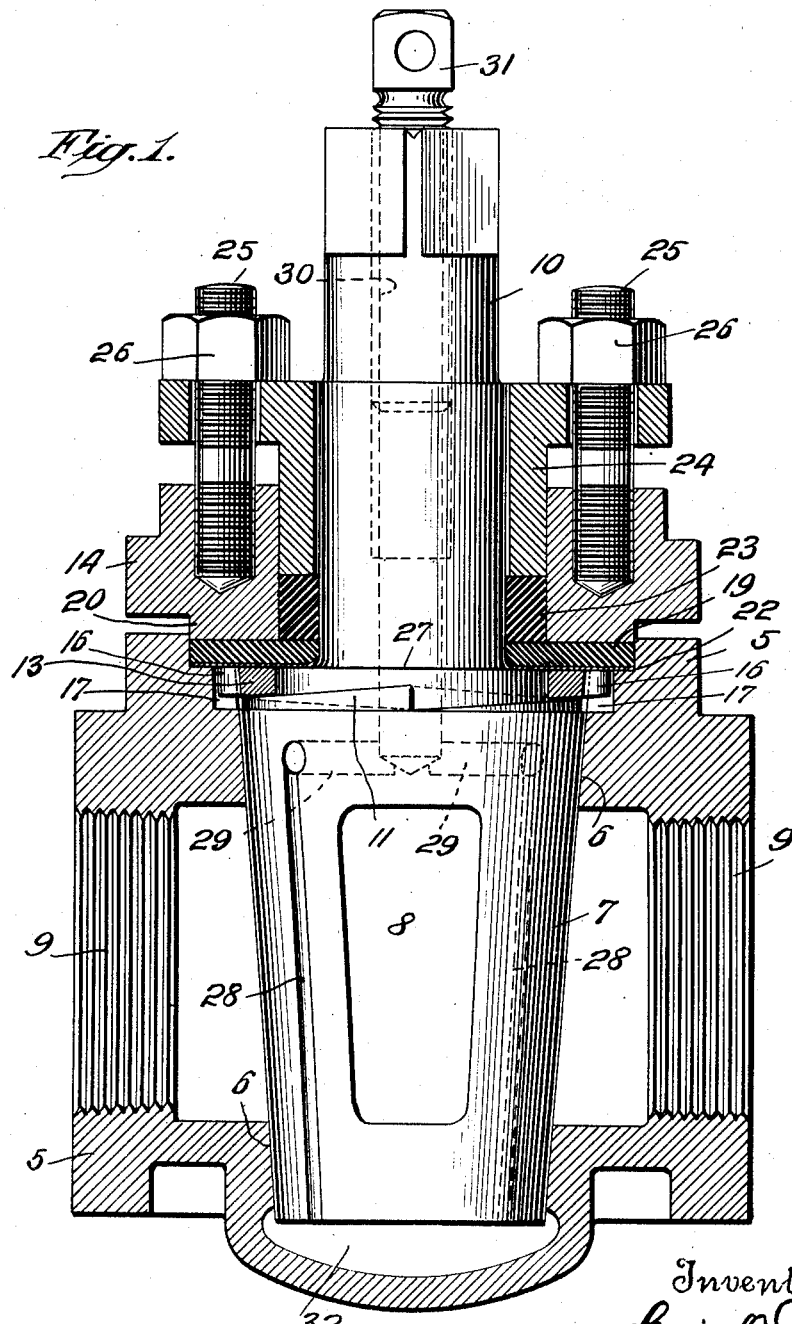

March 2, 1926.

L. D. MILLS ET AL 1,575,356

VALVE

Filed Jan. 30, 1923  2 Sheets-Sheet 1

Inventors
Louis D. Mills
Sven Johan Nordstrom
By their Attorney
Archibald Cox

March 2, 1926.                L. D. MILLS ET AL                1,575,356
                                  VALVE
                     Filed Jan. 30, 1923       2 Sheets-Sheet 2

Patented Mar. 2, 1926.

1,575,356

UNITED STATES PATENT OFFICE.

LOUIS D. MILLS, OF REDWOOD CITY, AND SVEN JOHAN NORDSTROM, OF SAN FRANCISCO, CALIFORNIA, ASSIGNORS TO MERCO NORDSTROM VALVE COMPANY, OF SAN FRANCISCO, CALIFORNIA, A CORPORATION OF DELAWARE.

VALVE.

Application filed January 30, 1923. Serial No. 615,964.

*To all whom it may concern:*

Be it known that we, LOUIS D. MILLS, a citizen of the United States, and a resident of Redwood City, in the county of San Mateo, State of California, and SVEN JOHAN NORDSTROM, a subject of the King of Sweden, and a resident of San Francisco, in the county of San Francisco, said California, have invented certain new and useful Improvements in Valves, of which the following is a specification.

The invention relates to an improvement in valves and more particularly to an improvement in plug valves.

One object of the invention is to produce an improved plug valve provided with means whereby the plug may be forced against its seat when the valve is closed to assure nonleakage, and with means whereby the plug will be held against its seat when the valve is open to prevent the fluid passing through the valve from depositing foreign substances or sediment on the seating surfaces of the valve, that is, on the plug or on the plug seat in the valve casing. A further object of the invention is to provide a plug valve of this type with means whereby the seating surfaces of the valve may be lubricated whether the valve is open or closed. Another object of the invention is to provide a plug valve, of the type wherein the plug is forced against its seat by coacting cam surfaces, with improved means for preventing the coacting cam surfaces from binding or sticking when the plug is turned to open the valve. Considerable difficulty has hitherto been experienced in opening plug valves wherein the plug is forced against its seat by coacting cam surfaces. As these valves have heretofore been commonly constructed the cam surfaces on the plug have been adapted to coact with cam surfaces either rigidly supported from the valve casing or loosely mounted therein, so that the plug is positively forced against its seat when the valve is closed. As a result of this positive and rigid engagement of the coacting cam surfaces they have a tendency to bind when the plug is turned to open the valve. Frequently the cam surfaces bind or stick to such an extent that considerable effort must be expended to open the valve. The present invention obviates this difficulty by providing improved means for supporting the cam surfaces so that they will not bind when the valve is opened. To these ends, the invention consists in the improved plug valve hereinafter described and particularly pointed out in the appended claims.

Figure 2:
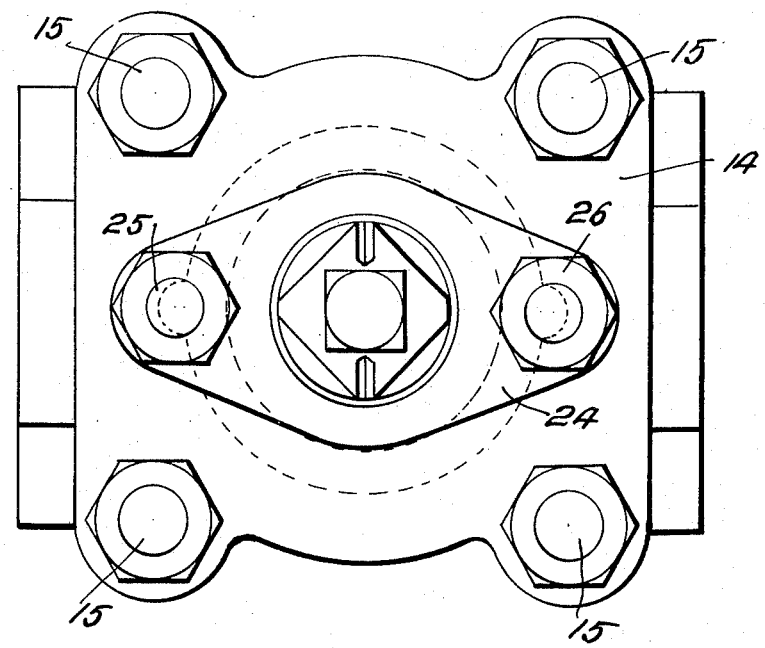
Figure 3:
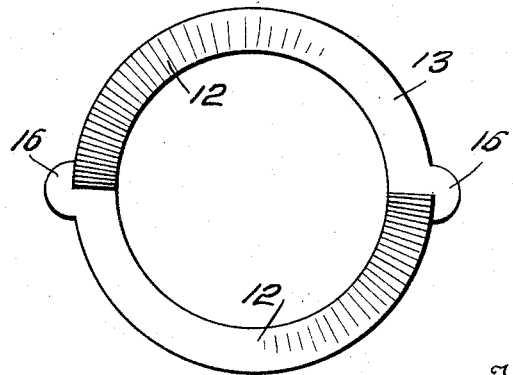

In the accompanying drawings illustrating the preferred form of invention, Fig. 1 is a longitudinal section through the improved valve with the plug in closed position; Fig. 2 is a plan of the parts shown in Fig. 1; and Fig. 3 is a bottom plan of the cam ring.

The improved plug valve as illustrated in the drawings comprises a casing 5 provided with a tapered hole or valve seat 6 in which is seated a tapered plug 7 having a hole 8 adapted to register with the passageway 9 through the casing when the valve is open. The tapered surface of the plug 7 and the surface of the valve seat 6 constitute the bearing surface or surfaces of the valve. The valve stem 10 projects from the tapered plug 7 and in squared at its outer end to receive a wrench by which the plug may be turned. The valve parts thus far described may be of any usual or preferred construction.

In order that the plug may be forced against its seat to prevent leakage when the valve is closed the rim of the upper end of the tapered plug 7 is provided with two cam surfaces 11 adapted to coact with the two corresponding, but oppositely disposed cam surfaces 12 formed on the lower face of a ring 13 interposed between the cam surfaces 11 and the valve cover 14 secured to the valve casing by the bolts 15. The cam ring 13 is loosely mounted in the casing, and to prevent it from turning, it is provided with ears 16 which are received in the recesses 17 formed in the upper part of the casing. The cam surfaces 11 on the plug 7 and the cam surfaces 12 on the ring 13 are so arranged that when the plug is turned to close the valve the plug is forced downwardly against its seat. To prevent the coacting cam surfaces from binding when the plug is turned to open the valve and also to permit the plug to be raised so that the bearing surfaces may be lubricated when the valve is closed, a ring 19 of slightly resilient material is interposed between the upper face of the ring 13 and the lower face of the annular flange 20 formed on the bottom of the cover 14.

By providing a resilient support or backing for the cam ring 13, as by means of the resilient ring 19, the coacting cam surfaces 11 and 12 are effectively prevented from sticking or binding when the plug is first turned to open the valve. This arrangement by which the plug is resiliently forced against its seat when the valve is closed also makes it possible to lubricate the bearing surfaces of the valve, when it is closed (as will be hereinafter explained), a desideratum which has been unattainable with valves of this type as heretofore constructed. A thin annular shim 22 of anti-friction metal is interposed between the lower face of the resilient ring 19 and the upper face of the cam ring 13 to prevent oil or other fluid from reaching the resilient ring 19 and also to prevent oil or other fluid from leaking upwardly around the valve stem 10.

Valves which are provided with coacting cam surfaces to force the plug against its seat when the valve is closed have heretofore been so constructed that when the valve is open the plug is free to rise from its seat. This is particularly undesirable where the valve is used in metallurgical or similar establishments, as it permits the fluid passing through the valve to deposit foreign substances, such as corrosive agents and sediments, on the seating surface of the valve. But even when the valve is used in a line through which relatively clean fluids, such as air or steam, pass, it is undesirable that the valve be free in its seat because the fluid washes away the lubricant with which the surfaces of the plug and valve seat should be coated. This objection is obviated in the present invention by providing resilient means for holding the plug against its seat when the valve is open. In the form of valve shown in the drawings an annular gasket 23 of resilient material is interposed between the lower end of a gland 24 adjustably secured to the casing 14 by means of the studs 25 and nuts 26, and the inner rim of the ring 19 which bears upon the shoulder 27 formed on the upper end of the plug 7 at the base of the stem 10. For mechanical reasons the inner edge or rim of the resilient ring 19 is extended inwardly to rest upon the shoulder 27, instead of having the gasket 23 bear directly on the shoulder 27. It will be understood, however, that the function performed by the inner edge of the ring 19 and the gasket 23 is distinct from the function performed by the portion of the ring 19 in contact with the upper face of the cam ring 13. The outer portion of the ring 19 affords a resilient backing for the cam ring to prevent the cam surfaces 11 and 12 from binding when the plug is turned to open the valve and also serves to permit the plug to be raised for lubrication purposes when the valve is closed. The inner portion or edge of the ring 19 coacts with the resilient gasket 23 to hold the plug against its seat when the valve is open and also permits the plug to be lifted for lubrication purposes when the valve is open. It will be understood that other means may be substituted for the resilient gasket 23 for resiliently holding the plug against its seat while the valve is open.

To secure an effective lubrication of the entire seating surface of the valve at all times while the valve is in use, means must be provided for supplying the lubricant to substantially the whole length of the plug so that when the plug is turned the lubricant may be distributed over the surface of the valve seat. For this purpose, the present invention provides two longitudinally extending lubricant grooves 28 formed in the tapered surface of the plug 7. The grooves 28 extend from the bottom of the plug up to substantially the top thereof and terminate in a hole 29 formed transversely through the top of the plug. The hole 29 communicates with the lower end of a lubricant reservoir 30 formed as a hole bored in the valve stem 10.

In order that the lubricant may be squeezed out along the length of the grooves 28, it is necessary that the plug be raised slightly from its seat whether the valve is closed or open. For this purpose, a screw 31 is provided, by turning which the lubricant in the reservoir 30 is forced through the hole 29, down the grooves 28 and into a chamber 32 formed in the bottom of the valve casing below the lower end of the plug. Although the coacting cam surfaces 11 and 12 compress the resilient ring 19 more or less when the plug is turned to closed position, nevertheless the ring 19 is still resilient enough to permit the plug to be raised from its seat when the screw 31 is turned to compress the lubricant in the reservoir 30 and force it down the grooves 28 into the chamber 32. The lifting of the plug permits the lubricant to ooze out on each side of the grooves 28 along the whole length thereof. The force exerted against the plug by the resilient gasket 23 and the inner edge of the ring 19 is sufficient to require a compression of the lubricant in the chamber when the valve is open to cause the plug to be lifted from its seat. If the plug were loose in its seat when the valve is open and the screw 31 is turned to force lubricant down the grooves 28, it is clear that substantially all the lubricant will be forced out around the upper ends of the grooves 28 and that no lubricant or substantially none will reach the lower ends of the grooves. Accordingly by holding the plug against its seat resiliently, and yet with an appreciable amount of force requiring the exertion of a greater amount of pressure to lift the plug, the lubricant will travel along the whole length of the grooves 28 and be forced out on each side thereof when the plug is lifted. Thus when the plug is turned from closed to open position or from open to closed position following a turning of the screw 31, the whole seating surface of the valve is effectively lubricated.

Having thus described the invention what we claim as new is:—

1. A valve comprising a casing having a passageway therethrough, a plug seated in the casing and having a hole adapted to register with the passageway, resiliently supported cam means cooperating with cam means on the plug to force the latter against its seat when the valve is closed, resilient means for pressing the plug against its seat when the valve is open, and means for raising the plug from its seat against the resilient means when the valve is open and against the resiliently supported cam means when the valve is closed so that the bearing surface of the valve may be lubricated.

2. A valve comprising a casing having a passageway therethrough, a plug seated in the casing and having a hole adapted to register with the passageway, resiliently supported means adapted to cooperate with cam means on the plug to force the latter against its seat when the valve is closed, grooves in the surface of the plug communicating with a chamber in the valve casing below the plug, and means for forcing lubricant through the grooves and into the chamber to lift the plug when the valve is closed so as to permit lubricant to be squeezed out along the length of the grooves.

3. A valve comprising a casing having a passageway therethrough, a plug seated in the casing and having a hole adapted to register with the passageway, cooperating cam means for forcing the plug against its seat when the valve is closed, a gland, and a resilient washer interposed between the cam means and the gland and against which the cam means act.

4. A valve comprising a casing having a passageway therethrough, a plug seated in the casing and having a hole adapted to register with the passageway, cooperating cam means for forcing the plug against its seat when the valve is closed, a gland, a resilient washer interposed between the cam means and the gland and against which the cam means act, a cover, and a resilient washer interposed between the plug and the cover for holding the plug against its seat when the valve is open.

5. A valve comprising a casing having a passageway therethrough, a plug seated in the casing and having a hole adapted to register with the passageway, cam surfaces formed on the large end of the plug, a cam ring loosely mounted in the valve casing and having cam surfaces adapted to coact with the cam surfaces on the plug to force the plug against its seat when the valve is closed, a cover for closing the valve, resilient means interposed between the cover and the cam ring, and means for holding the plug resiliently against its seat when the valve is open.

6. A valve comprising a casing having a passageway therethrough, a plug seated in the casing and having a hole adapted to register with the passageway, cam surfaces on the large end of the plug, a cam ring loosely mounted in the casing and having cam surfaces adapted to coact with the cam surfaces on the plug to force the plug against its seat, a cover for the casing, a ring of resilient material interposed between the cover and the cam ring, the inner edge of the resilient ring overlapping a shoulder on the plug formed at the base of the valve stem, a gland adjustably secured to the valve cover and a resilient gasket interposed between the gland and the inner edge of the resilient ring, said gasket and resilient ring cooperating to hold the plug against its seat when the valve is open.

7. A valve comprising a casing having a passageway therethrough, a plug seated in the casing and having a hole adapted to register with the passageway, cam means for forcing the plug against its seat when the valve is closed, resilient means against which the cam action is made, means for resiliently holding the plug against the seat when the valve is open, a reservoir for containing lubricant, longitudinal grooves in the surfaces of the plug connected with the reservoir, the other ends of the grooves communicating with a chamber in the casing beneath the plug, and means for compressing the lubricant to force the plug from its seat against the resilient means when the valve is open or closed.

8. A valve comprising a casing having a passageway therethrough, a plug seated in the casing and having a hole adapted to register with the passageway, cam surfaces formed on the upper end of the plug, a cam ring loosely mounted in the casing and having cam surfaces adapted to coact with the cam surfaces on the plug to force the plug against its seat when the valve is closed, a cover for the casing, a ring of resilient material interposed between the cover and the cam ring, resilient means interposed between the valve gland and the plug to hold the plug against its seat when the valve is open, a lubricant reservoir in the valve stem communicating with a chamber in the casing below the plug through grooves formed longitudinally in the surface of the plug, and means for compressing the lubricant to lift the plug when it is closed and when it is open.

LOUIS D. MILLS.
SVEN JOHAN NORDSTROM.